(12) United States Patent
Kuznetsov et al.

(10) Patent No.: US 11,916,500 B2
(45) Date of Patent: Feb. 27, 2024

(54) SYNCHRONOUS GENERATOR WITH CONFIGURABLE MODALITY

(71) Applicant: Raytheon Company, Waltham, MA (US)

(72) Inventors: Stephen Kuznetsov, Marlborough, MA (US); Eric Stich, Marlborough, MA (US)

(73) Assignee: RAYTHEON COMPANY, Waltham, MA (US)

(*) Notice: Subject to any disclaimer, the term of this patent is extended or adjusted under 35 U.S.C. 154(b) by 136 days.

(21) Appl. No.: 17/645,308

(22) Filed: Dec. 20, 2021

(65) Prior Publication Data

US 2023/0198444 A1   Jun. 22, 2023

(51) Int. Cl.
H02P 25/18      (2006.01)
H02K 3/28       (2006.01)
H02K 7/00       (2006.01)

(52) U.S. Cl.
CPC ............ H02P 25/184 (2013.01); H02K 3/28 (2013.01); H02K 7/003 (2013.01); H02K 2213/09 (2013.01)

(58) Field of Classification Search
CPC ........ H02P 25/184; H02K 3/28; H02K 7/003; H02K 2213/09
See application file for complete search history.

(56) References Cited

U.S. PATENT DOCUMENTS

| 10,622,924 B2 | 4/2020 | Niedrist | |
| 2005/0127880 A1* | 6/2005 | Colley | H02J 3/02 322/7 |
| 2012/0007459 A1* | 1/2012 | Mondal | H02K 17/44 310/185 |
| 2018/0026563 A1* | 1/2018 | Schnetzka | H02P 9/007 290/44 |
| 2021/0344331 A1 | 11/2021 | Kuznetsov et al. | |
| 2022/0115973 A1* | 4/2022 | Toyodome | H02P 21/20 |
| 2023/0145148 A1* | 5/2023 | Joseph | H02K 11/25 310/54 |

* cited by examiner

Primary Examiner — Zoheb S Imtiaz
(74) Attorney, Agent, or Firm — Kinney & Lange, P.A.

(57) ABSTRACT

Techniques and methods related to a multi-mode operation of a synchronous electrical generator. The synchronous generator is configurable in at least two modes: a grid-power mode and a power-generation mode. In the power-generation mode, electrical power is generated in response to power produced by a prime mover. In the grid-power mode, the rotor is in standstill mode, and the configurable rotor winding is configured to generate a plurality of AC magnetic fields. The system provides for seamless transfer of power between grid-power to power generation using an energy storage unit and associated power conditioning apparatus.

20 Claims, 12 Drawing Sheets

SYNCHRONOUS GENERATOR WITH CONFIGURABLE MODALITY

BACKGROUND

Mobile electric power systems are used to provide power to mobile military equipment, such as radar systems, launcher devices, etc. Such mobile electric power systems must operate in different countries which have electrical power grids of various different voltages, frequencies, etc. For example, some countries have power grids operating at 208 VAC, and others have power grids operating at 480 VAC. Some countries have power grids operating at 50 Hz frequency, and others at 60 Hz frequency. Although power can be provided to these mobile electric power systems with different voltages and frequencies, the power required by the load devices (e.g., the radar systems, launcher devices, etc.) must be controlled according to their specifications. Not infrequently, these mobile electric power systems must convert power provided by a local grid into a different type of power required by the load.

Not only can power specifications of load devices be quite different from those of the local electrical grids, but local power grids located in these various countries can be unreliable at times, especially during times of military conflict. Furthermore, sometimes these load devices are used in remote places far away from any local grid connection. Therefore, mobile electric power systems are typically configured to use alternate power sources for providing power to their load devices during grid failure and/or for remote operation. Often, these mobile electric power systems include a generator for generating electrical power when the local grid is unable to provide such power. Instant transition between grid and backup power sources is required so as not to interrupt operation of the load devices.

Traditionally, these mobile electric power systems used large and heavy transformers for converting the AC grid power into a DC form suitable for specific loads. Because mobile electric power systems are important for the operation of tactical military equipment where well-maintained roads might not be present. Such mobility can be facilitated by using light-weight components. Large power transformers can limit the mobility of these mobile electric power systems. Therefore, it would be helpful to find new ways for providing power to mobile equipment using light-weight components.

SUMMARY

Apparatus and associated methods relate to a system for multi-mode synchronous electrical power generation. The system includes a stator and a rotor having rotor windings. The stator includes main stator windings that have first, second, and third stator phase windings wye-configured for three-phase operation. Each of the first, second, and third stator phase windings have a plurality of series-connected inductive coils. The pluralities of series-connected inductive coils of the first, second, and third stator windings are distributed about the stator in a stator arrangement. The rotor is rotatable within the stator. The rotor includes a slip ring(s) via which an excitation power is applied to the rotor. The rotor includes a rotor configuration engine having an excitation detector, a configuration switch(es), and a configuration controller. The excitation detector detects whether the excitation power applied to the rotor is a DC excitation power or an AC excitation power. The configuration controller sets the configuration switch(es) to a power-generation switch configuration in response to the excitation detector detecting a DC excitation power. The configuration controller sets the configuration switch(es) to a grid-power switch configuration in response to the excitation detector detecting an AC excitation power. The rotor windings include first, second, and third rotor phase excitation windings, each having a plurality of series-connected inductive coils distributed about the rotor in a fashion that corresponds to the stator arrangement. When the switches are in a grid-power switch configuration, the first, second, and third rotor phase excitation windings are wye-configured to create a revolving magnetic field. When the switches are in power-generation switch configuration, the first second and third rotor phase excitation windings are in series-parallel configuration, thereby creating a stationary magnetic rotor field.

Some embodiments relate to a method for operating a synchronous electric generator in multiple modes. The method includes operation in two modes: a grid-power mode and a power-generation mode. In the grid-power mode, the method includes: i) applying three-phase AC grid power to three wye-configured stator phase windings at first, second, and third grid-connection nodes; ii) applying a first phase of the three-phase AC grid power across first and second excitation nodes of a rotor as an excitation power; iii) wye-configuring three rotor phase excitation windings in response to applying the first phase of the three-phase AC grid power across the first and second excitation nodes, the wye-configured rotor phase excitation windings having first, second, and third power-connection nodes; iv) phase shifting, by a first phase angle, the excitation power applied to the first excitation node; v) conductively coupling the excitation signal phase shifted by the first phase angle to the first power-connection node; vi) phase shifting, by a first phase angle, the excitation signal applied to the first excitation node; vii) conductively coupling the excitation power phase shifted by the second phase angle to the second power-connection node; and viii) conductively coupling the excitation power applied to the first excitation node to the third power-connection node of the wye-configured rotor phase excitation windings. In a power-generation mode, the method includes: i) applying DC power across first and second excitation nodes of a rotor for purposes of field excitation; ii) straight-configuring three rotor phase excitation windings in response to applying the DC power across the first and second excitation nodes, the straight-configured rotor phase excitation windings having first and second power-connection nodes; iii) conductively coupling the excitation power applied to the first excitation node to the first power-connection node; iv) conductively coupling the excitation power applied to the second excitation node to the second power-connection node; and v) rotating the straight-configured rotor within wye-configured stator phase windings, thereby generating electrical power at first, second, and third power-output nodes.

DETAILED DESCRIPTION

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, mobile electric power systems typically require the ability to connect onto a utility grid. However, a utility grid may operate at a different frequency and different voltage level than is required by the load. As a result, large and heavy power transformers are often used to solve such a mismatch between the local grid and the desired load power. For these applications, the size and weight of the required transformers can hinder mobility. In addition, energy storage is required to maintain power to the loads during transitions between drawing power from the grid and generating power via a prime mover.

To address these or other issues, this disclosure provides various mobile electric power systems that facilitate efficient and compact frequency and voltage transformation with inputs from either a utility source or a local prime mover generator (such as a diesel engine). Circuitry forming part of each power system obviates the need for traditional power transformers, resulting in high overall power density and greater mobility. The disclosed power systems can also transition from a utility source to a local prime mover in a manner that is transparent to one or more loads, and in so doing can accomplish a transition from one power source to a second source. In addition, the disclosed power systems facilitate variable frequency output, which accommodates the needs of different types of loads.

Figure 1:
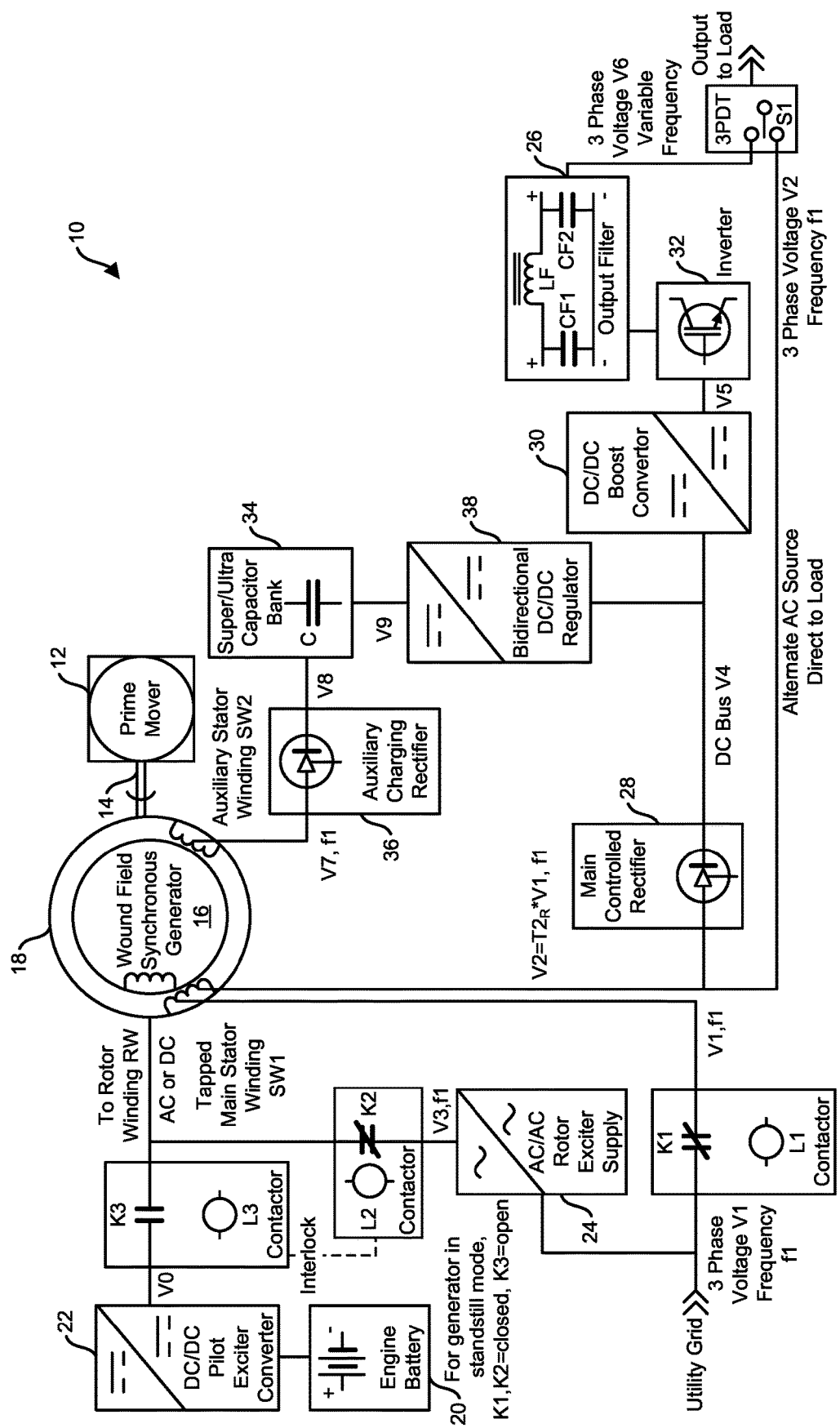
FIG. 1 is a block diagram of a multi-mode synchronous electrical generator.

FIG. 1 is a block diagram of a multi-mode synchronous electrical generator. In FIG. 1, multi-mode synchronous electrical generator 10 is configurable to be operated in various modes, including grid-power mode and power-generation mode. Mode configuration is performed by opening and closing contactors K1, K2, and K3, by positioning transfer switch S1, and by configuring rotor windings. To configure multi-mode synchronous electrical generator 10 in power-generation mode, contactors K1 and K2 are opened, and contactor K3 is closed. Typically, multi-mode synchronous electrical generator 10 is operated in such a power-generation mode when the local electrical grid is unable to provide the electrical power needed for load operation or there is no available local grid at the location where multi-mode synchronous electrical generator 10 is to be used.

For operation as an electrical power generator in power-generation mode, multi-mode synchronous electrical generator 10 includes prime mover 12, drive shaft 14, rotor 16, and stator 18. Prime mover 12 is configured to rotate drive shaft 14, which in turn rotates rotor 16 with respect to stator 18. Rotor 16 includes rotor windings RW that, when conducting electrical current, generate a magnetic field(s). When contactor K3 is closed, engine battery 20 provides DC electrical power to the rotor windings RW via DC-DC pilot exciter converter 22 (i.e., DC to DC pilot exciter converter), thereby causing DC electrical current to be conducted by the rotor windings RW of rotor 16. Rotation of such a magnetic field(s) induces AC electrical current(s) into tapped stator main windings SW1 of stator 18, thereby generating AC electrical power at output taps of tapped main stator windings SW1, which can then be provided to a load. The induced AC electrical current(s) is synchronous with a rotation frequency of rotor 16 (i.e., the frequency of the induced electrical current(s) is proportional to the frequency of rotation of the rotor).

To configure multi-mode synchronous electrical generator 10 in grid-power mode, contactors K1 and K2 are closed, and contactor K3 is opened. Typically, multi-mode synchronous electrical generator 10 is operated in such a grid-power mode when the local electrical grid is available and able to provide the electrical power needed for load operation.

For operation in grid-power mode, AC power from the local grid (of voltage V1 and frequency f1) is provided to both the rotor windings RW of rotor 16 and to the tapped stator main windings SW1 of stator 18. A single-phase AC current is provided to rotor windings RW via AC-AC rotor exciter 24 (AC to AC rotor exciter). AC-AC rotor exciter 24 converts three-phase AC power provided by the local grid to single phase AC power (of voltage V3) of the same frequency—frequency f1—as the frequency of the three-phase AC power provided. Such single-phase AC power is provided to rotor windings RW via slip rings (not depicted). In grid-power mode, rotor windings RW are configured to create, from the received single-phase AC excitation power, a polyphase rotor current and consequent rotating magnetic field for excitation. The rotor windings, when conducting this polyphase excitation current, so created, magnetizes a rotor core, a stator core, and an airgap therebetween. Tapped stator main windings SW1 have various output taps so as to be operable as an autotransformer when the rotor is at stand-still (e.g., in grid-power mode). Such an autotransformer type of connection can be used to either boost or buck (i.e., attenuate) voltage V1 derived from the local grid. By using both the tapped stator main windings SW1 and the rotor windings RW in this manner, the autotransformer type of connection permits a selective choice of winding output voltages than if only one of these two sets of windings RW and SW1 were to be used.

Regardless of whether electrical power is provided by the local grid in grid-power mode or generated by prime mover 12 in power-generation mode, such generated power can be either directly provided to the load or it can be further conditioned before being provided to the load. If the power required by the load is consistent with the voltage V2 and frequency f1 of power provided at the output taps of tapped stator main windings SW1, then switch Si can connect the output V2 of multi-mode synchronous electrical generator 10 directly to the load. If, however, further conditioning of the power is desired or needed, such power can be conditioned using power conditioning circuitry. Such conditioning can be performed, for example, if the frequency of power or voltage level of power provided by the local grid is incompatible with load power requirements. With switch Si connecting the load to the output of the tapped stator main windings SW1, unconditioned electrical power provided by the output taps of tapped stator main windings SW1 is provided directly to the load. With switch Si instead connecting the load to the output of LC output pi-type filter 26, conditioned power will be provided to the load. Such conditioning can be performed, for example, if the frequency or voltage level of power provided by the local grid is incompatible with load's power requirements.

Conditioning of the electrical power is performed by first converting, via main AC-DC rectifier 28 (i.e., AC to DC rectifier), the AC electrical power provided at the output taps of the tapped stator main windings SW1 to DC rectified power (of voltage V4). DC-DC boost converter 30 (i.e., DC to DC boost converter) then boosts the rectified DC power. The boosted DC power (of voltage V5) is then converted, via DC-AC inverter 32 (i.e., DC to AC inverter), again to AC power (of voltage V6 and frequency f2). Finally, the AC power is filtered by L-C output pi-type filter 26 before being provided to the load. Such conversion from AC, to DC, and then back again to AC permits conversion between different electrical specifications of AC power (e.g., grid vs. load specification). Such differences can include, for example, differences in voltage, frequency, phase, etc.

Ultra-capacitor DC energy storage device 34 can be used to maintain DC power being provided to DC-AC inverter 32 and consequently maintain the AC output power during transitions between grid-power mode and power-generation mode. In order to maintain such DC power, ultra-capacitor DC energy storage device 24 must be charged (or its charge must be maintained). Charging is performed by converting, via charging rectifier 36, AC voltage provided by stator charging windings SW2 to a DC voltage, which is then provided to ultra-capacitor DC energy storage device 24. Bidirectional regulator 38 can be used both as a device for providing power from ultra-capacitor DC energy storage device 24 to DC-DC boost converter 30 (e.g., during mode transitions), and for providing charging of ultra-capacitor DC energy storage device 24 during times that main AC-DC rectifier 28 is providing DC rectified power to DC-DC boost converter 30.

Figure 2:
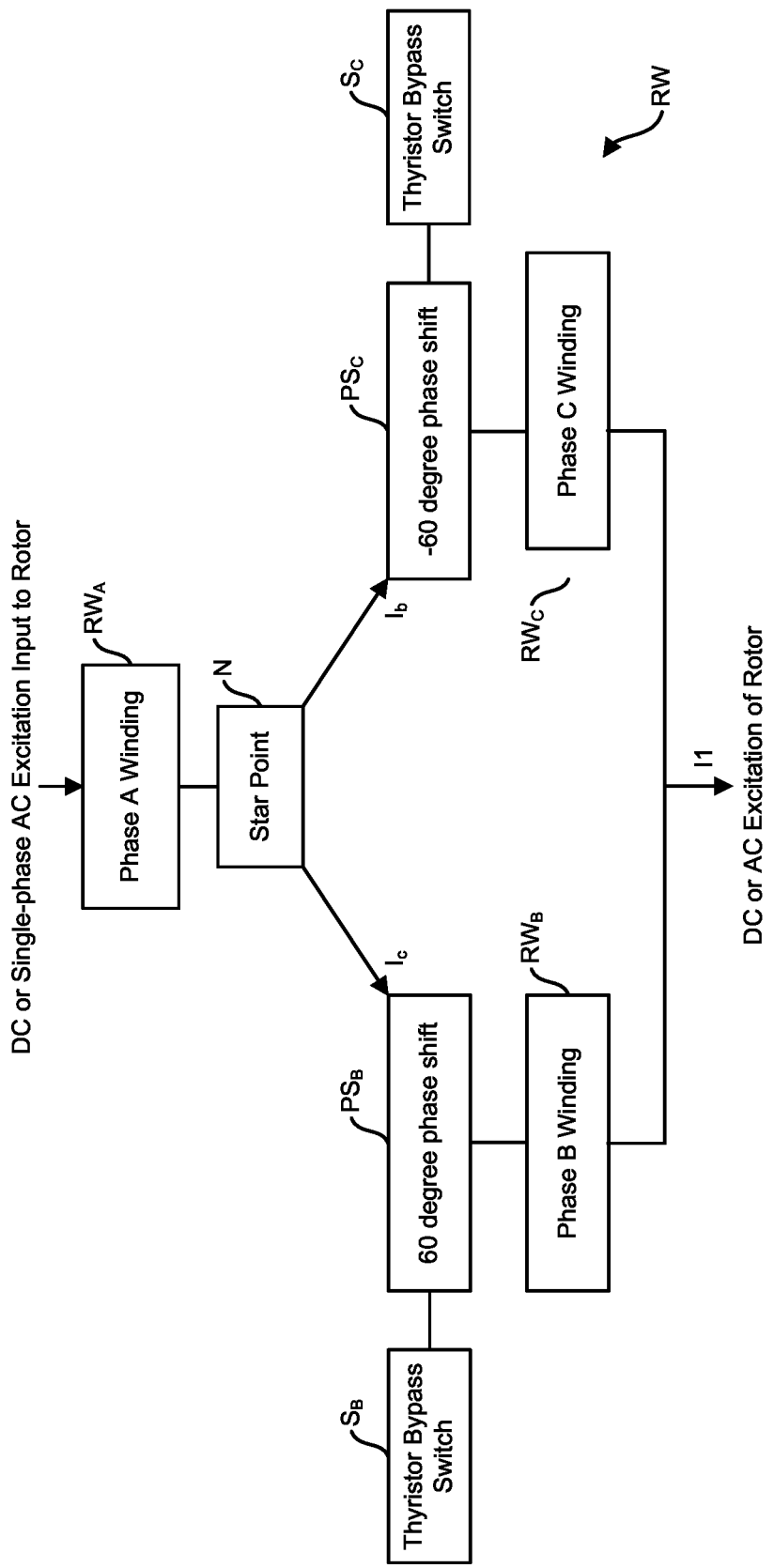
FIG. 2 is a block diagram of a circuit implementation of a configurable rotor for a multi-mode synchronous electric generator.

FIG. 2 is a block diagram of a circuit implementation of a configurable rotor for a multi-mode synchronous electric generator. In FIG. 2, rotor windings RW include phase windings $RW_A$, $RW_B$, and $RW_C$ connected to one another at star point N, phase-shifting networks $PS_B$ and $PS_C$, and thyristor bypass switches $S_B$ and $S_C$. Phase windings $RW_A$, $RW_B$, and $RW_C$ can be either configured as wye-connected windings to create a revolving magnetic field when rotor 16 is excited by single-phase AC power, or configured to create a stationary magnetic field when excited by DC power.

For AC operation, AC power is provided across rotor windings RW from phase winding $RW_A$ to the common connection between phase windings $RW_B$ and $RW_C$. During AC operation, thyristor bypass switches $S_B$ and $S_C$ are off so as not to bypass phase-shifting networks $PS_B$ and $PS_C$. With bypass switches $S_B$ and $S_C$ off, phase-shifting networks $PS_B$ and $PS_C$ shift the phase of AC electrical currents $I_B$ and $I_C$ that flow through phase windings $RW_B$ and $RW_C$, respectively. Phase-shifting networks $PS_B$ and $PS_C$ are designed to shift the phase angles of AC electrical currents flowing through phase windings $RW_B$ and $RW_C$ approximately plus and minus 60 degrees, respectively. For example, phase-shifting network $PS_B$ can be a primarily inductive network, and phase-shifting network $PS_C$ can be a primarily capacitive network. Such a phase shift results in the phases of phase windings $RW_A$, $RW_B$, and $RW_C$ to be 120 degrees phase shifted with respect to one another. Such a phase shift configuration, along with wye-configured phase windings $RW_A$, $RW_B$, and $RW_C$, facilitates three-phase AC operation of rotor windings RW and creates a revolving magnetic field which magnetizes the rotor and stator magnetic cores and the airgap therebetween. Phase-shifting networks $PS_B$ and $PS_C$ can be reactive elements, such as, for example, inductors or capacitors, having inductances or capacitance, respectively, that result in proper phase shifting of the electrical currents $I_B$ and $I_C$ conducted by rotor phase excitation windings $RW_B$ and $RW_C$, respectively. To create the revolving magnetic field at a rotor standstill condition, the phase angles of the electric currents conducted by rotor phase excitation windings $RW_A$, $RW_B$, and $RW_C$ must be approximately 120 degrees apart from one another, and currents $I_B$ and $I_C$ should be approximately balanced in magnitude. It is also possible to create a rotor revolving magnetic field with greater than three phases by having several phase shifting networks. For example, to create a revolving magnetic field with a 6-phase system, four phase-shifting inductive-capacitive-resistive networks of −90 degrees, −30 degrees, +30 degrees, and +90 degrees phase shift resulting in six groups of operation currents rotor windings that are 60 degrees apart. Rotor windings RW are configured for AC operation when rotor 16 is at standstill and multi-mode synchronous electrical generator 10 is operated in grid-power mode. In grid-power mode, AC voltage from the grid is applied across the AC configured rotor windings RW with regulation of current amplitude and power level performed by AC-AC rotor exciter 23 (depicted in FIG. 1).

For DC operation, DC power is provided across rotor windings RW from phase winding $RW_A$ to the common connection between phase windings $RW_B$ and $RW_C$. During DC operation, thyristor bypass switches $S_B$ and $S_C$ are closed, bypassing phase-shifting networks $PS_B$ and $PS_C$, respectively. Such bypassing of phase-shifting networks $PS_B$ and $PS_C$ effectively place phase windings $RW_B$ and $RW_C$ in parallel. Rotor windings RW are configured for DC operation when multi-mode synchronous electrical generator 10 is operated in power-generation mode. In power-generation mode, DC voltage from engine battery 20 and DC-DC pilot exciter converter 22 is applied across the DC configured rotor windings RW.

Figure 3:
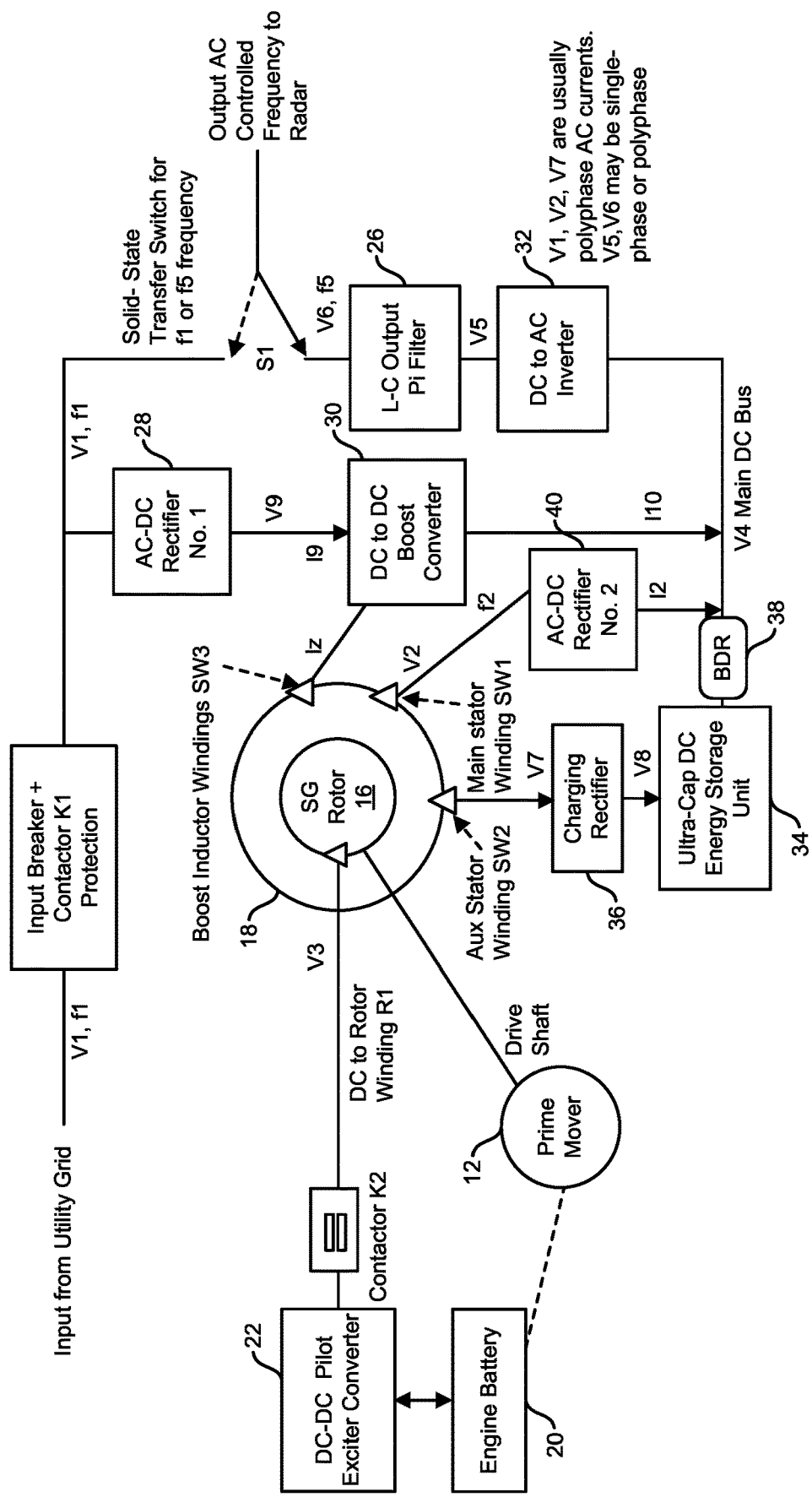
FIG. 3 is a block diagram of a DC-DC booster converter augmented by machine inductance.

FIG. 3 is a block diagram of a DC-DC booster converter augmented by machine inductance. In FIG. 3, multi-mode synchronous electrical generator 10 is configured to operate in power-generation mode. In addition to the components of multi-mode synchronous electrical generator 10 disclosed above with respect in the FIG. 1 embodiment, the FIG. 3 embodiment includes two separate AC-DC rectifiers 28 and 40, first AC-DC rectifier 28, which rectifies AC power provided by the local grid and second AC-DC rectifier 40, which rectifies AC power generated by the synchronous generator. In the FIG. 3 depicted configuration, DC-DC boost converter 30 uses a portion of the stator windings Si for its inductive characteristic to boost the DC voltage, which has been rectified by first AC-DC rectifier 28. First AC-DC rectifier 28 and DC-DC boost converter 30 can augment the power generated by a power-generator configured multi-mode synchronous electrical generator 10. Such a configuration can be used, for example, when the voltage of the local grid is lower than that needed to support the necessary DC bus level needed for providing power to a specific load. In such a configuration, the portion of the stator windings used for boost purposes is selected so as not to significantly affect power generation, as will be shown in more detail below.

Figure 4:
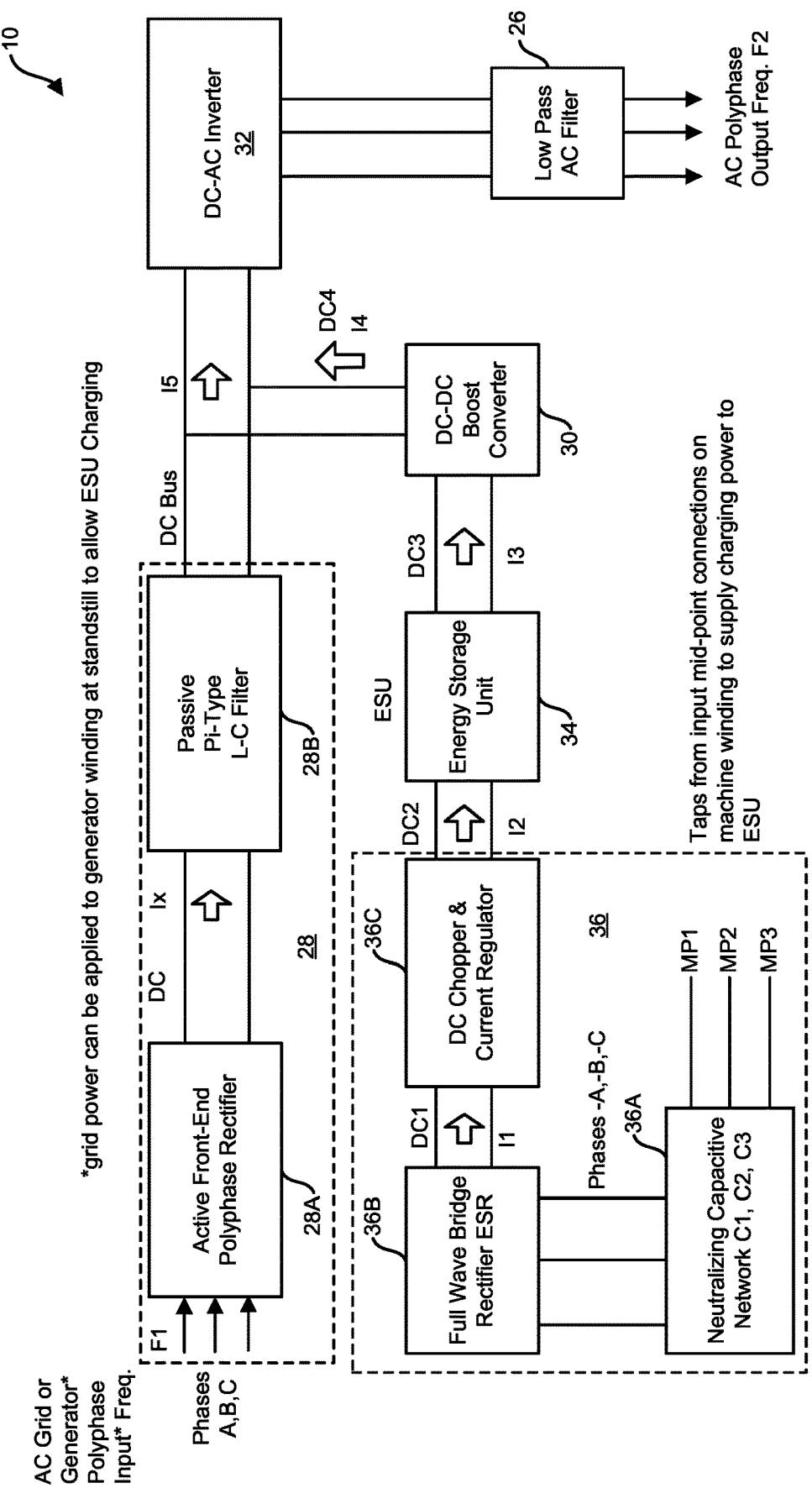
FIG. 4 is a block diagram of a six-phase generator winding with boost circuit.

FIG. 4 is a block diagram of a three-phase generator winding with boost circuit. In FIG. 4, multi-mode synchronous electrical generator 10 is depicted in block diagram form. Multi-mode synchronous electrical generator 10 includes main AC-DC rectifier 28 which includes active front-end polyphase rectifier 28A and passive pi L-C filter 28B. Multi-mode synchronous electrical generator 10 also includes charging rectifier 36, which includes neutralizing capacitive network (C1, C2, and C3) 36A, full-wave bridge rectifier (ESR) 36B, and DC chopper and current regulator 36C. One end of neutralizing capacitive network 36A is coupled to input mid-point connections of the stator windings via capacitors C1, C2, and C3, while the other end of. neutralizing capacitive network 36A is conductively connected to full-wave bridge rectifier 36B. Full-wave bridge storage rectifier 36B rectifies each of the three phases of AC power received from neutralizing capacitive network 36A and delivers rectified DC power to DC chopper and current regulator 36C. DC chopper and current regulator 36C provides electrical energy to energy storage unit (ESU) 34, which in the FIGS. 1 and 3 embodiments was depicted as ultra-capacitor energy storage device 34. DC chopper and current regulator 36C regulates electrical energy to energy storage device 34 in a manner that is controlled and safe for DC energy storage device 34.

Energy storage unit 34 is conductively connected to DC-DC boost converter 30. DC-DC boost converter then boosts the voltage of energy provided by energy storage device 34 to a higher voltage than the voltage of energy storage device 34. Both DC-DC boost converter 30 and AC-DC rectifier 28 are conductively connected together forming the DC main bus which is an input to DC-AC inverter 32. DC-AC inverter 32 then converts DC electrical energy received from DC-DC boost converter 30 and AC-DC rectifier 28 into AC electrical energy of a controllable frequency. Such AC energy is then filtered by low-pass AC filter 26. In the embodiment depicted in FIG. 4, the output of main AC-DC rectifier 28 is electrically connected to the output of DC-DC boost converter 30, whereas in the embodiment depicted in FIG. 1, the output of main AC-DC rectifier 28 is electrically connected to the input of DC-DC boost converter 30.

Figure 5A:
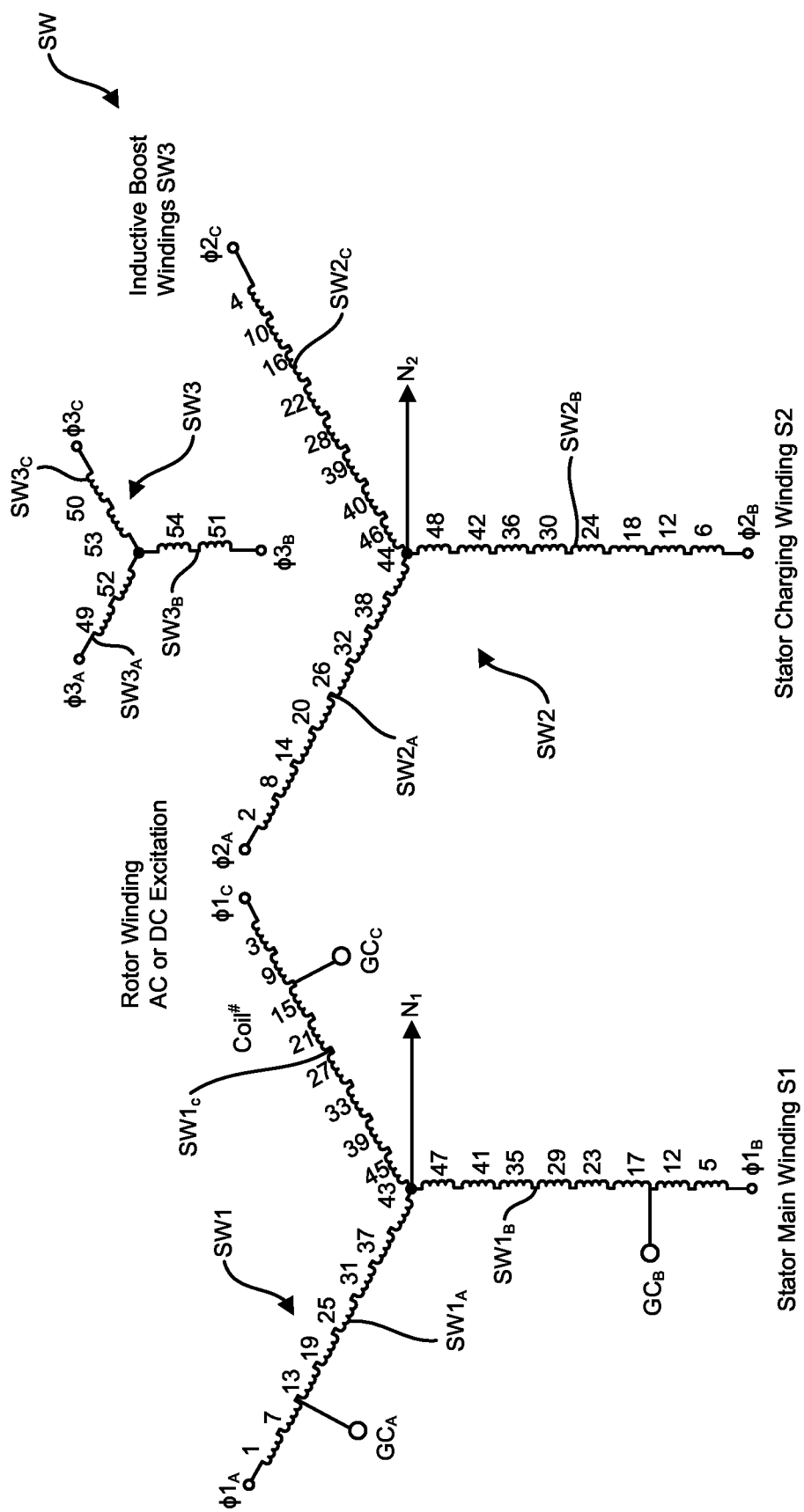
FIGS. 5A-5B are circuit schematics of two embodiments of an 8-pole multi-mode synchronous electric generator's stator windings configured with multiple taps.
Figure 5B:
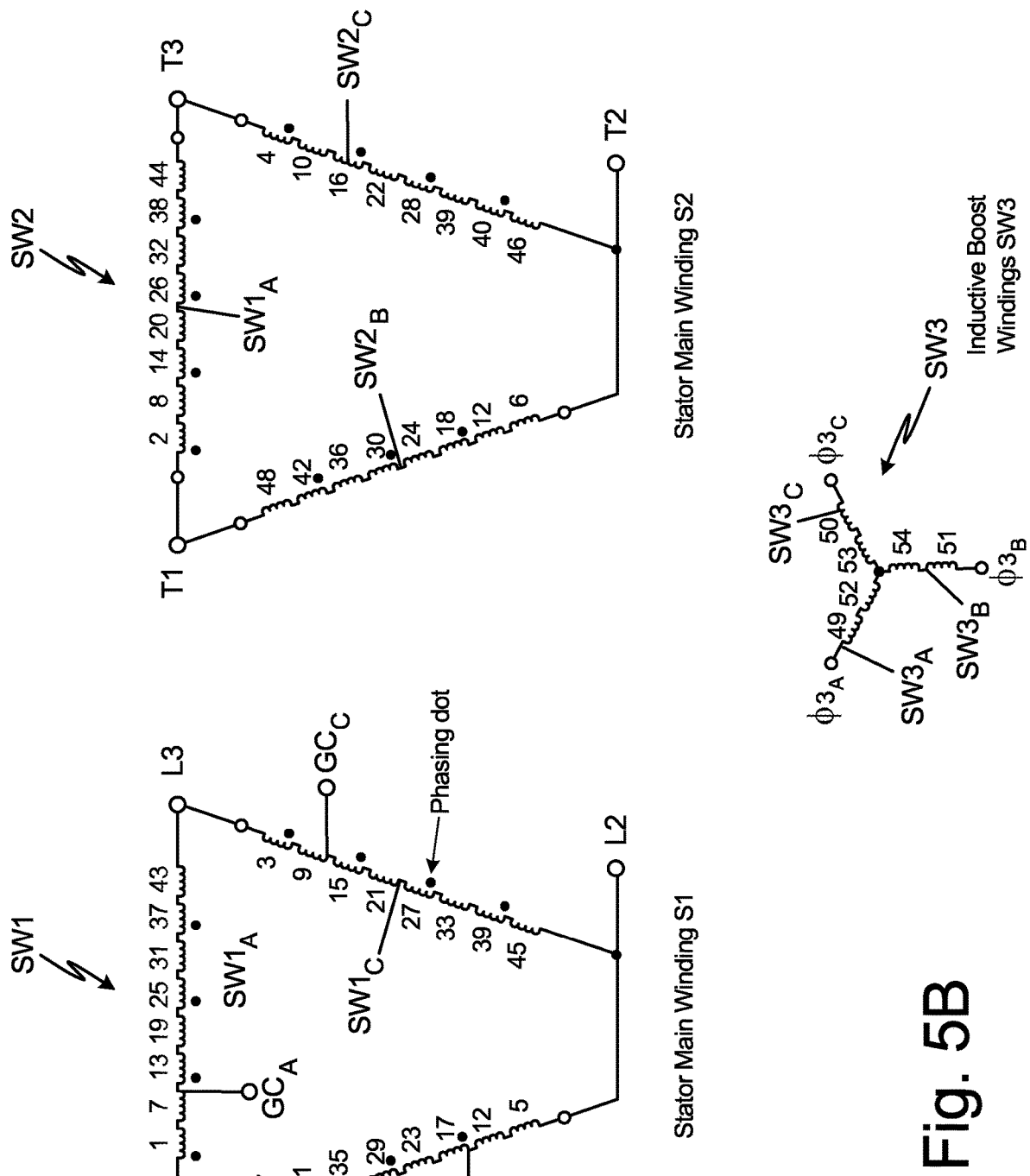

FIGS. 5A-5B are circuit schematics of two embodiments of an 8-pole multi-mode synchronous electric generator's stator windings configured with multiple taps. In FIG. 5A, stator windings SW includes tapped stator main windings SW1, stator charging windings SW2, and boost inductor windings SW3. In FIG. 5A, each of tapped stator main windings SW1, stator charging windings SW2 are configured in a wye configuration, whereas in FIG. 5B each of tapped stator main windings SW1, stator charging windings SW2 is configured in a delta configuration. Tapped main stator windings SW1 is wye-configured with three stator main phase windings— $SW1_A$, $SW1_B$, $SW1_C$— for three-phase AC operation. Each of stator main phase windings $SW1_A$, $SW1_B$, and $SW1_C$ has eight inductive coils peripherally arranged about stator 18 so as to create an 8-pole magnetic field within multi-mode synchronous electric generator 10. Each of stator phase windings $SW1_A$, $SW1_B$, and $SW1_C$ has a single slot/pole/phase as shown, yet higher numbers of slots/poles/phases are possible. These twenty-four inductive coils of stator main windings SW1 interact with the magnetic field established by the inductive coils of rotor windings RW to produce electromagnetic torque. Thus, when operating in power-generation mode, three-phase power is generated at stator main phase outputs $\phi 1_A$, $\phi 1_B$, and $\phi 1_C$ of stator main phase windings, $SW1_A$, $SW1_B$, and $SW1_C$, respectively.

Each of stator main phase windings $SW1_A$, $SW1_B$, and $SW1_C$ of tapped stator main windings SW1 has taps, $GC_A$, $GC_B$, and $GC_C$ (i.e., grid connections) respectively, for connecting tapped main stator windings SW1 to the local grid. Phase outputs $\phi 1_A$, $\phi 1_B$, and $\phi 1_C$ provide electrical power as boosted voltage outputs of stator main windings $SW_1$. Alternatively, stator main phase outputs $\phi 1_A$, $\phi 1_B$, and $\phi 1_C$ can be used as input terminals and can provide connection to the local grid, and taps $GC_A$, $GC_B$, and $GC_C$ can be used as output terminals to provide attenuation of grid voltage. Stator main winding SW1 are configured as a voltage-boosting or voltage-bucking autotransformer when connected in these manners. Such boosting (or bucking) of grid voltage can be performed with the generator in standstill condition (e.g., grid-power mode). When operating in a boost mode, stator main phase outputs $\phi 1_A$, $\phi 1_B$, and $\phi 1_C$ provide power to AC-DC rectifier 28. When operated in power-generation mode, stator main windings SW1 are isolated from the local grid, and power is produced via power conversion of mechanical power produced by rotation of rotor 16 by prime mover 12.

Stator charging windings SW2 is also wye-configured, having three stator charging phase windings—$SW2_A$, $SW2_B$, and $SW2_C$—for three-phase AC operation. In some embodiments, windings SW1 and SW1 are galvanically isolated. Each of stator charging phase windings $SW2_A$, $SW2_B$, and $SW2_C$ is wound as an 8-pole winding peripherally arranged about stator 18 so as to coincide with each of the eight poles of the rotor 16 of multi-mode synchronous electric generator 10. These twenty-four inductive coils share the magnetic flux in the airgap with main stator winding SW1 generated by the rotor magnetic field. The inductive coils of rotor windings RW can have different numbers of turns than those of main stator windings SW1. Furthermore, the excitation signal used to excite rotor windings RW can have a different power level than the excitation of main stator windings SW1. Thus, when operating in power-generation mode, three-phase power is generated at stator charging phase outputs $\phi 2_A$, $\phi 2_B$, and $\phi 2_C$ of phases windings, $SW2_A$, $SW2_B$, and $SW2_C$, respectively. Stator charging windings SW2 are conductively coupled to charging rectifier 36, which charges energy storage unit 34.

The stator also houses boost inductor windings SW3, which is also wye-configured, having three boost phase windings—$SW3_A$, $SW3_B$, and $SW3_C$—for three-phase AC operation. Each of boost phase windings $SW3_A$, $SW3_B$, and $SW3_C$ only includes two inductive coils corresponding to two of the eight poles of the rotor 16 of multi-mode synchronous electric generator 10. These two inductive coils of each of boost phase windings $SW3_A$, $SW3_B$, and $SW3_C$ are physically located proximate one another in a dedicated peripheral zone. These inductive coils are wound in a conventional double-layer lap winding and are energized only when grid power is available and there is a need for operating DC-DC boost converter 30 as shown in FIG. 3 (which depicts boost current as $I_Z$). When operating in power-generation mode, boost phase windings $SW3_A$, $SW3_B$, and $SW3_C$ are open circuit.

Figure 6:
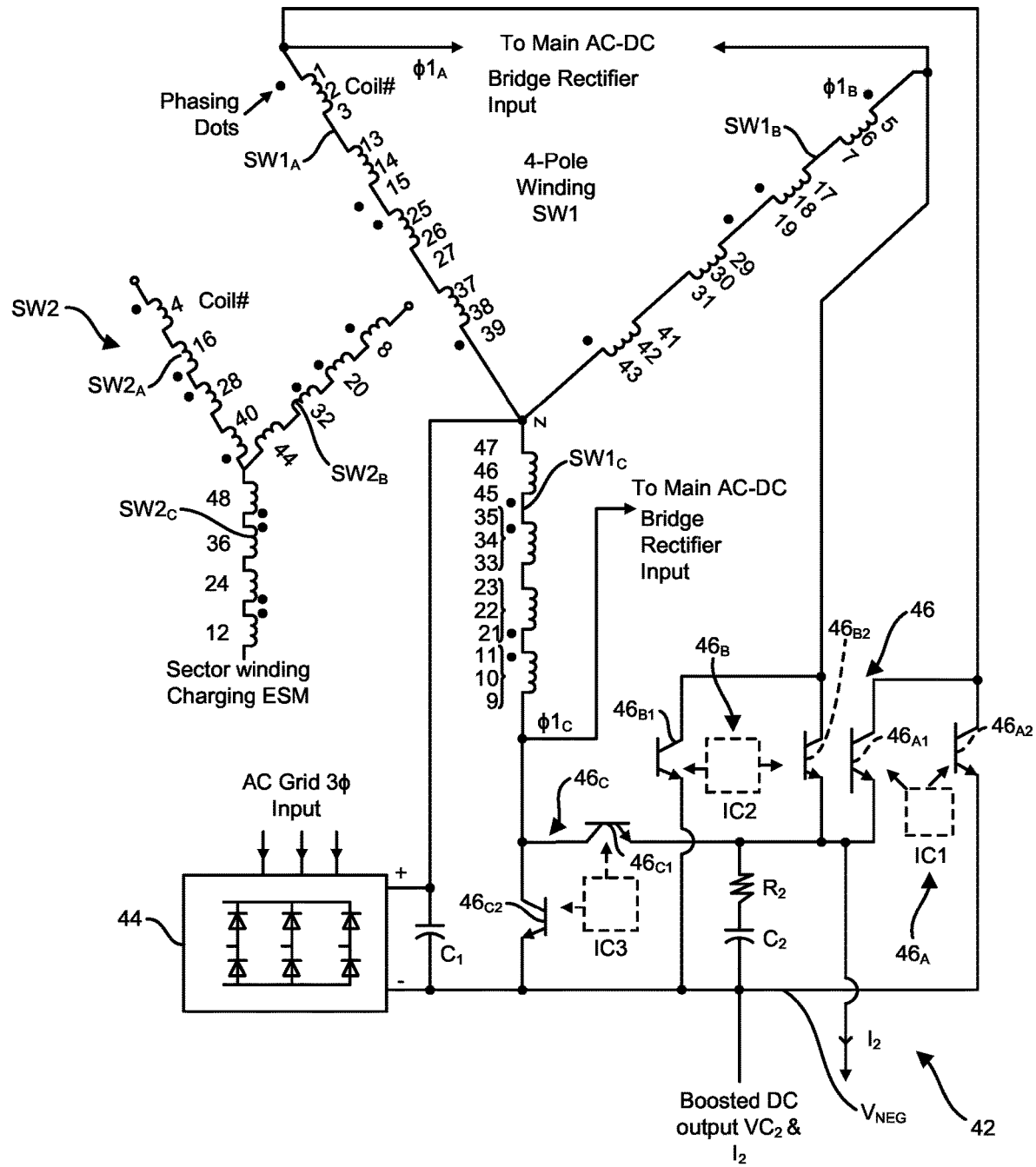
FIG. 6 is a circuit schematic of a 4-pole multi-mode synchronous electric generator's stator windings configured with integral boost circuitry.

FIG. 6 is a circuit schematic of a 4-pole multi-mode synchronous electric generator's stator windings configured with integral boost circuitry. In FIG. 2, stator windings SW includes tapped stator main windings SW1, stator charging windings SW2, and boost inductor windings SW3. Tapped main stator windings SW1 is wye-configured with three stator main phase windings—SW1$_A$, SW1$_B$, and SW1$_C$—for three-phase AC operation. Each of stator main phase windings SW1$_A$, SW1$_B$, and SW1$_C$ has four inductive coils radially arranged about stator 18, so as to coincide with a corresponding one of the four poles of rotor 16 of multi-mode synchronous electric generator 10. These four inductive coils are oriented so that when the four poles pass thereby, electrical currents induced therein are constructive (i.e., of the same polarity). Thus, when operating in power-generation mode, three-phase power is generated at stator main phase outputs ϕ$_{1A}$, ϕ$_{1B}$, and ϕ$_{1C}$ of stator main phase windings, SW1$_A$, SW1$_B$, and SW1$_C$, respectively.

The FIG. 6 embodiment includes integral boosting circuitry 42. Boosting circuitry 42 includes full-wave bridge rectifier 44 and switching network 46. Full-wave bridge rectifier 44 biases the star point N of the wye-configured main stator windings SW to a positive DC voltage. Such a DC bias voltage is substantially equal to a peak magnitude of the AC grid voltage. Each of stator main phase outputs ϕ1$_A$, ϕ1$_B$, and ϕ1$_C$ of the wye-configured main stator windings SW1 is conductively coupled to switching network 46. Switching network 46 includes phase switching subnetworks 46$_A$, 46$_B$ and 46$_C$. Switches 46$_{A1}$ and 46$_{A2}$ of phase switching subnetworks 46$_A$ are gated ON such that when positive induced current is provided by phase outputs ϕ$_{1A}$, such current positively charges capacitor C$_2$. Switches 46$_{A1}$ and 46$_{A2}$ of phase switching subnetworks 46$_A$ are also gated ON, so that when negative induced current is provided by phase outputs ϕ$_{1A}$, such negative current is drawn from common reference net V$_{NEG}$. Switches 46$_{B1}$ and 46$_{B2}$ are similarly gated ON such that when positive induced current is provided by phase output ϕ1$_B$, such current positively charges capacitor C$_2$, and when negative induced current is provided by phase outputs ϕ$_{1B}$, such negative current is drawn from common reference net V$_{NEG}$. Lastly, switches 46$_{C1}$ and 46$_{C2}$ are also gated ON, such that when positive induced current is provided by phase output ϕ1$_C$, such current positively charges capacitor C$_2$, and when negative induced current is provided by phase outputs ϕ1$_C$, such negative current is drawn from common reference net V$_{NEG}$. Such boosting, using stator main windings SW1, as shown in FIG. 6, can be performed when the generator is at standstill and power is being supplied by the local grid, for example.

In the FIG. 6 embodiment, stator charging windings SW2 are also wye-configured, having three stator charging phase windings—SW2$_A$, SW2$_B$, and SW2$_C$—for three-phase AC operation in a 4-pole machine. Each of stator charging phase windings SW2$_A$, SW2$_B$, and SW2$_C$ also has four inductive coils peripherally arranged about stator 18 so as to coincide with each of the four poles of the rotor 16 of multi-mode synchronous electric generator 10. A total of twelve inductive coils form a three-phase balanced charging supply with 120-degree offset amongst phases. In the embodiment depicted in FIG. 6, one coil/pole/phase is formed within each of stator phase windings SW1$_A$, SW1$_B$, and SW1$_C$. Thus, when operating in power-generation mode, three-phase power is generated at stator charging phase outputs ϕ$_{2A}$, ϕ$_{2B}$, and ϕ$_{2C}$ of phases windings, SW2$_A$, SW2$_B$, and SW2$_C$, respectively. Stator charging windings SW2 are conductively coupled to charging rectifier 36, producing DC power that charges energy storage unit 34, as shown in FIG. 3.

Figure 7:
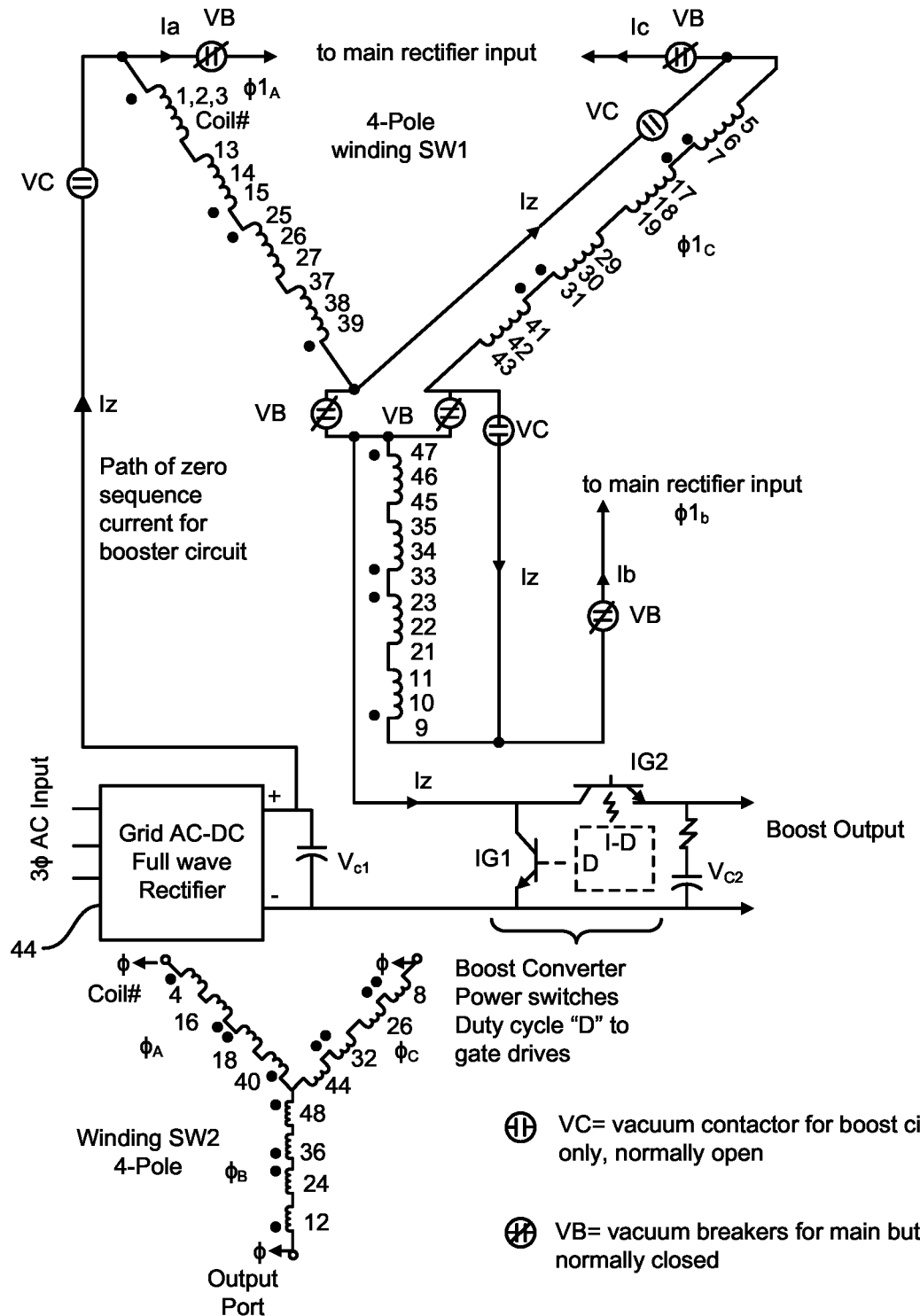
FIG. 7 is a circuit schematic of a dual-use 4-pole multi-mode synchronous electric generator's stator windings with integral boost circuitry.

FIG. 7 is a circuit schematic of a dual-use 4-pole multi-mode synchronous electric generator's stator windings with integral boost circuitry. In FIG. 7, main stator windings SW1 are configurable via vacuum contactors VC and vacuum breakers VB. During power-generation mode, normally-open vacuum contactors VC are open and normally-closed vacuum breakers VB are closed. Such configuration of vacuum contactors VC and vacuum breakers VB connect main stator windings SW1 in a wye configuration so as to configure multi-mode synchronous electrical generator 10 in power-generation mode. During grid-power mode (e.g., when generator is in stand-still), normally-open vacuum contactors VC are closed and normally-closed vacuum breakers VB are opened. Such configuration of vacuum contactors VC and vacuum breakers VB arrange each of stator main phase windings SW1$_A$, SW1$_B$, and SW1$_C$ in a serial manner. Such a configuration maximizes the inductance of stator main windings SW1. Full-wave bridge rectifier 44 converts AC grid power to rectified DC power. Such rectified DC power is conductively coupled to the inputs of the boost rectifier. The other end of serially configured stator main windings SW1 (i.e., star node N) is conductively coupled to switching network 48. Switches IG$_1$ and IG$_2$ of switching network 48 are gated ON so as to create a boosted DC voltage on capacitor C$_2$.

In the FIG. 7 embodiment, stator charging windings SW2 are also wye-configured, having three stator charging phase windings—SW2$_A$, SW2$_B$, and SW2$_C$—for three-phase AC operation. When operating in power-generation mode, three-phase power is generated at stator charging phase outputs ϕ2$_A$, ϕ2B, and ϕ2$_C$ of phases windings, SW2$_A$, SW2$_B$, and SW2$_C$, respectively. Stator charging windings SW2 are conductively coupled to charging rectifier 36, which charges energy storage unit 34, as shown in FIG. 3.

Figure 8:
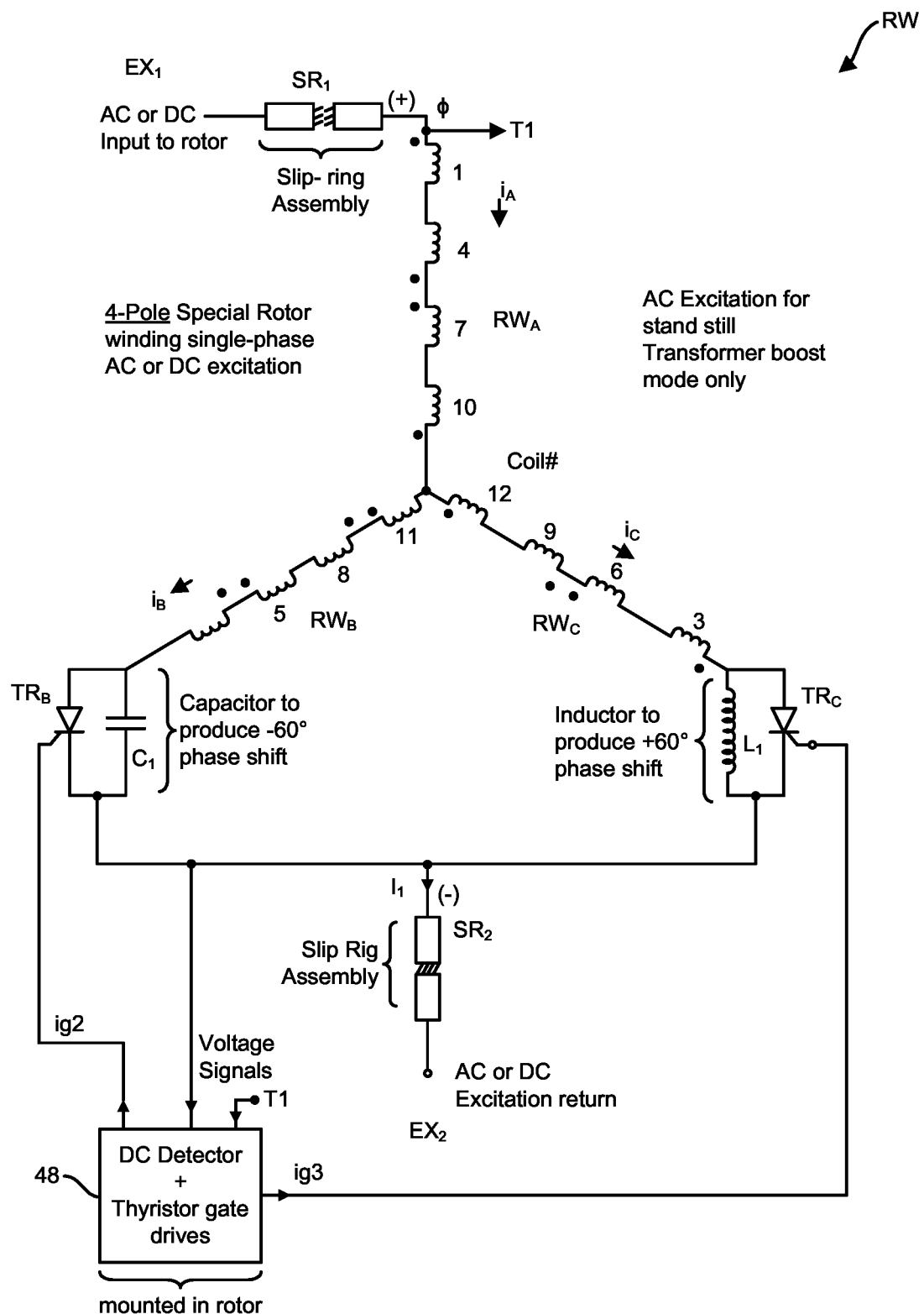
FIG. 8 is a circuit schematic of a configurable rotor winding of a multi-mode synchronous electric generator.

FIG. 8A is a circuit schematic of a configurable rotor winding of a multi-mode synchronous electric generator. In FIG. 8 rotor windings RW are wye-configured with three rotor phase excitation windings—RW$_A$, RW$_B$, RW$_C$—for three-phase AC operation. Each of rotor phase excitation windings RW$_A$, RW$_B$, RW$_C$ has four inductive coils radially arranged about rotor 16 so as to create four magnetic poles on rotor 16 of multi-mode synchronous electric generator 10. These four inductive coils are of the same pole-pitch and wavelength to align with four corresponding inductive coils of each of the three stator phase windings SW1$_A$, SW1$_B$, SW1$_C$, (as well as SW2$_A$, SW2$_B$, SW2$_C$ and SW3$_A$, SW3$_B$, SW3$_C$). Thus, when operating in power-generation mode, three-phase power is generated at stator main phase outputs ϕ$_{1A}$, ϕ$_{1B}$, and ϕ$_{1C}$ of stator main phase windings, SW1$_A$, SW1$_B$, and SW1$_C$, respectively.

Rotor windings RW includes thyristors TR$_B$ and TR$_C$, which can configure rotor phase excitation windings RW$_B$ and RW$_C$ as being either wye-connected or parallel-connected. If thyristors TR$_B$ and TR$_C$ are gated ON (i.e., thyristor switches are closed, shorting out inductor L$_1$), then rotor phase excitation windings RW$_B$ and RW$_C$ are parallel-connected, as both ends are conductively coupled to one another. First ends are conductively coupled with one another at star node N, and second ends are conductively coupled to one another at excitation node EX$_2$, via slip ring assembly SR$_2$. Such a parallel-connected configuration is used in power-generation mode. In power-generation mode, a DC excitation is provided across excitation nodes EX$_1$ and EX$_2$. This DC excitation causes DC current to flow through rotor phase excitation windings RW$_A$, and then to split and flow through both rotor phase excitation windings RW$_B$ and RW$_C$. Such a current distribution results in a 4-pole rotor of N—S—N—S polarity, which is Dc magnetized as in conventional synchronous machinery.

When the generator is in stand-still (e.g., in grid-power mode), thyristors $TR_B$ and $TR_C$ are off (i.e., thyristor switches are opened), then rotor phase excitation windings $RW_B$ and $RW_C$ are wye-connected. The AC current conducted by rotor phase excitation windings $RW_B$ and $RW_C$ are controlled by choice of capacitor $C_1$ and inductor $L_1$. Inductor $L_1$, in series with its internal resistance, is selected to shift the phase of AC current flowing through rotor phase excitation windings $RW_C$ by 60 degrees. Similarly, capacitor $C_1$, which typically has a shunt resistor due to characteristic of the dielectric film, is selected to shift the phase of AC current flowing through rotor phase excitation windings $RW_B$ by 60 degrees (in the opposite phase direction than that performed for rotor phase excitation windings $RW_C$). The net phase shift between currents flowing through rotor phase legs $RW_B$ and $RW_C$ is 120 degrees therebetween. In grid-power mode, AC excitation is provided across excitation nodes $EX_1$ and $EX_2$ (e.g., using one of the three phases of the local grid power). This AC excitation causes AC current to flow through rotor phase excitation windings $RW_A$, $RW_B$, and $RW_C$ in a three phase function, thereby creating a revolving magnetic field.

Configuration of rotor windings RW is controlled by DC detector and thyristor driver 48. The DC detector determines if the applied excitation is DC or AC. If the determined excitation is DC, then DC detector and thyristor driver 48 actuates (i.e., closes) both thyristors $TR_A$ and $TR_B$, thereby configuring rotor phase excitation windings $RW_B$ and $RW_C$ in parallel. If, however, the determined excitation is AC, then DC detector and thyristor driver 48 actuates neither of (i.e., opens) thyristors $TR_A$ and $TR_B$, thereby leaving phase windings $RW_A$, $RW_B$, and $RW_C$ in a wye configuration with phase shifting elements L1 and C1 operative.

Figure 9:
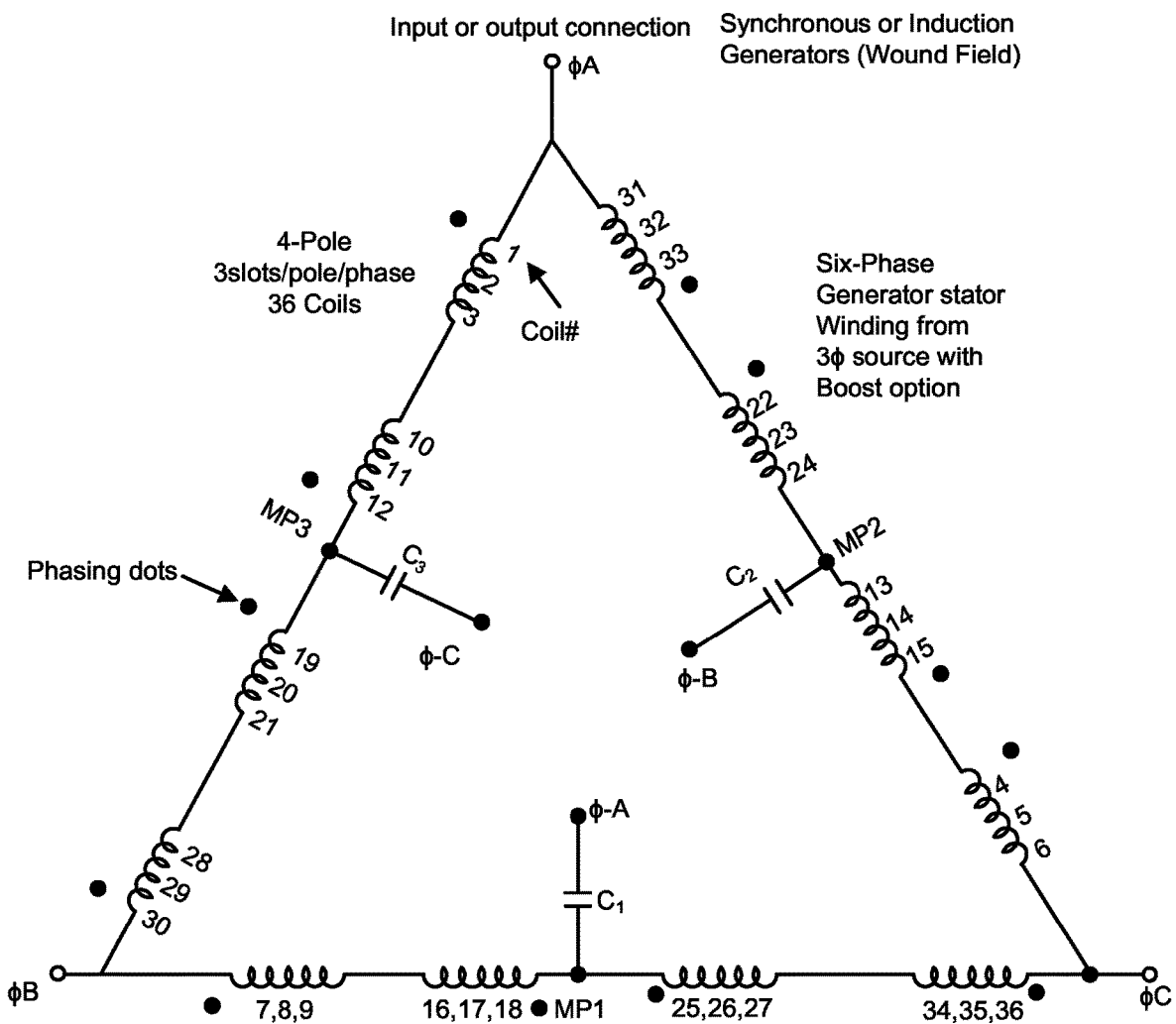
FIG. 9 is a circuit schematic of six-phase generator winding with boost circuitry.

FIG. 9 is a circuit schematic of six-phase generator winding with boost circuitry. In FIG. 9, an example delta-connected winding depicts a six-phase stator winding, which could be used, for example, as stator main windings SW1, stator charging windings SW2, or stator boost inductor windings SW3. Such delta-configured windings provide for six phases, three at the delta vertices, and three at the midpoints MP1, MP2, and MP3 between delta vertices. Such six-phase power can be advantageous in that rectification of such six-phase power can have lower AC content (e.g., AC ripple), and/or can be performed using a smaller set of capacitors C1, C2, and C3.

Figure 10:
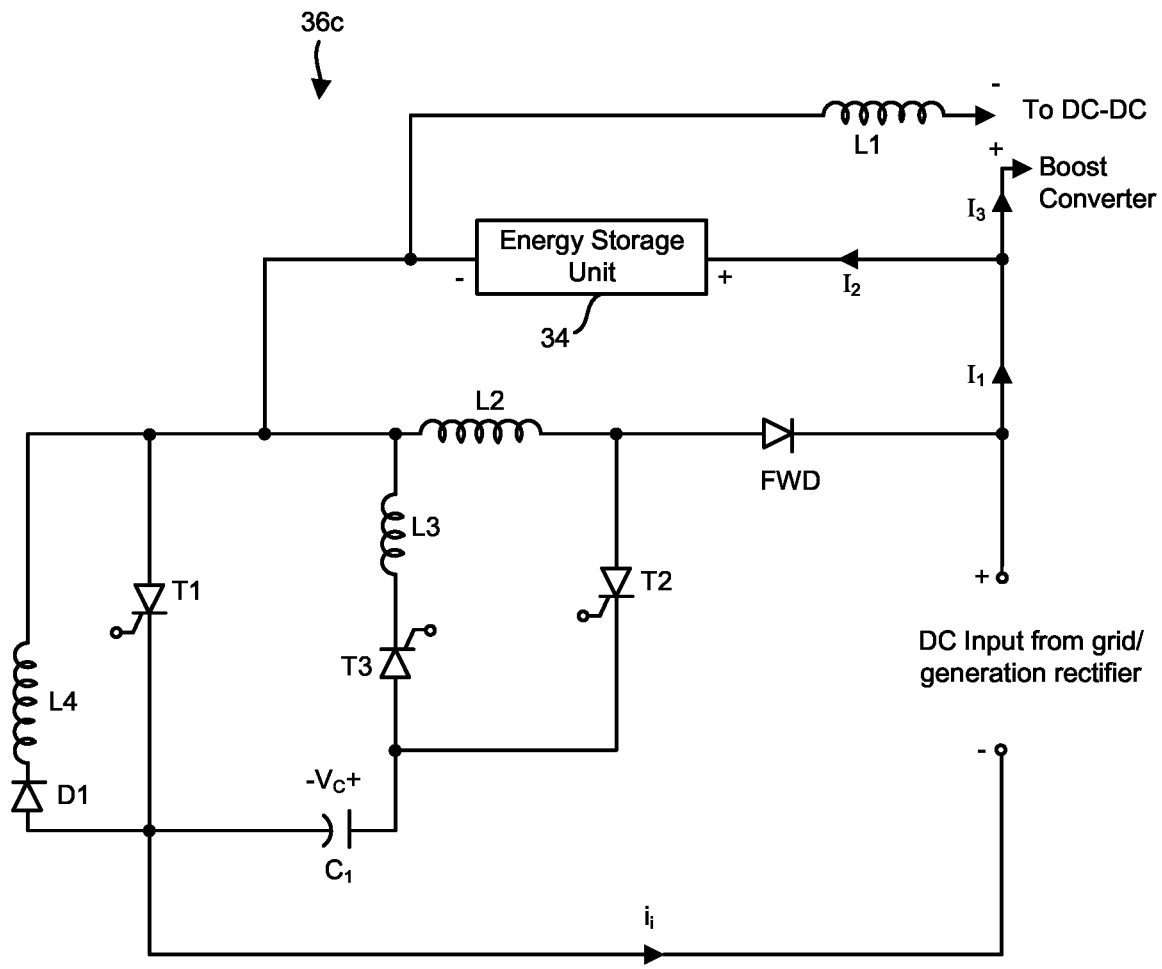
FIG. 10 is a circuit schematic of a high-power DC chopper circuit and current regulator for ESU charging.

FIG. 10 is a circuit schematic of a high-power DC chopper circuit and current regulator for ESU charging. In FIG. 10, high-power DC chopper circuit and current regulator 36C includes inductors L1, L2, L3, and L4, thyristors T1, T2, and T3, commutating capacitor C1, and free-wheeling diode FWD. Thyristor T1 is the main conducting thyristor and thyristors T2 and T3 are for commutating the current of thyristor T1. Energy storage unit ESU 34 is also shown connected to high-power DC chopper circuit 36C. Note that inductors L2, L3, and L4 share a common node and are connected to primary-wound coils in the electrical generator, thus serving a dual purpose. As such, the wye-configured windings of boost inductor SW3 can be commandeered as inductors L2, L3, and L4 of high-power DC chopper circuit 36C. Thus, high-power DC chopper circuit 36C can be made as a low weight integral component of multi-mode synchronous electrical generator 10.

Figure 11:
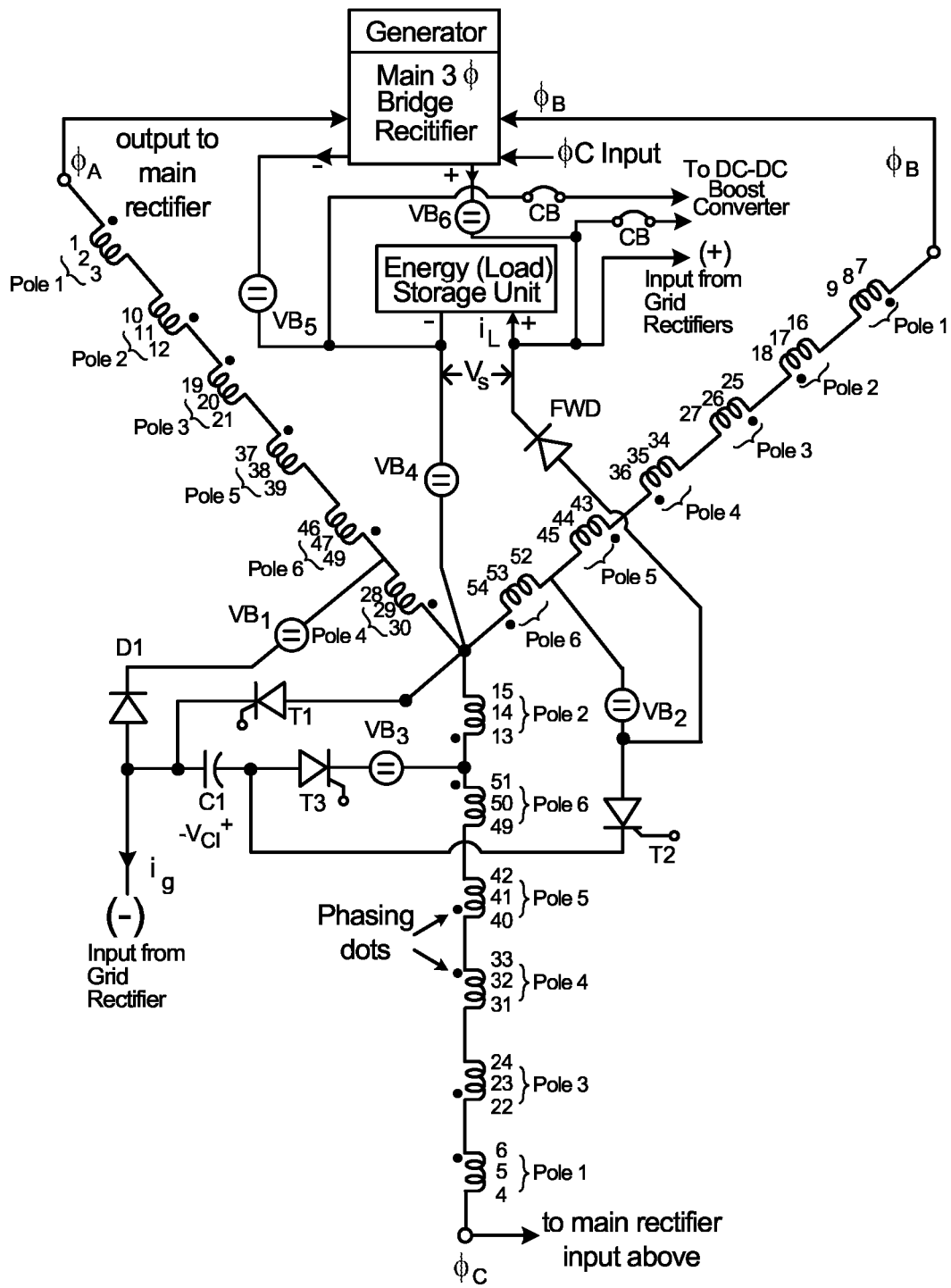
FIG. 11 is an embodiment of a 6-pose 54-slot synchronous generator with staggered pole stator winding groups to produce three integrated chopper circuit inductors.

FIG. 11 is an embodiment of a 6-pole 54 slot synchronous generator with staggered pole stator winding groups to produce three integrated chopper circuit inductors (L2, L3, and L4 as referenced above with regard to the circuit schematic depicted in FIG. 10) as stator poles 2, 4, and 6 in a total of 9 coils connected together at the common star point of a wye configuration. FIG. 11 also depicts an arrangement of the 6 vacuum breakers $VB_1$-$VB_6$, three thyristor switches T1-T3 for the chopper, two power diodes D1 and FWD, an energy storage unit and the main 3-phase bridge rectifier to compose a complete system.

Discussion of Possible Embodiments

The following are non-exclusive descriptions of possible embodiments of the present invention.

Apparatus and associated methods relate to a system for multi-mode synchronous electrical power generation. The system includes a stator and a rotor having rotor windings. The stator includes main stator windings that have first, second, and third stator phase windings wye-configured for three-phase operation. Each of the first, second, and third stator phase windings have a plurality of series-connected inductive coils. The pluralities of series-connected inductive coils of the first, second, and third stator windings are distributed about the stator in a polyphase stator arrangement. The rotor is rotatable within the stator. The rotor includes a slip ring(s) via which an excitation power is applied to the rotor. The rotor includes a rotor configuration engine having an excitation detector, a configuration switch (es), and a configuration controller. The excitation detector detects whether the excitation power applied to the rotor is a DC excitation power or an AC excitation power. The configuration controller sets the configuration switch(es) to a power-generation switch configuration in response to the excitation detector detecting a DC excitation power. The configuration controller sets the configuration switch(es) to a grid-power switch configuration in response to the excitation detector detecting an AC excitation power. The rotor windings include first, second, and third rotor phase excitation windings, each having a plurality of series-connected inductive coils distributed about the rotor in a fashion that corresponds to the stator arrangement. When the switches are in a grid-power switch configuration, the first, second, and third rotor phase excitation windings are wye-configured to create a revolving magnetic field. When the switches are in power-generation switch configuration, the first second and third rotor phase excitation windings are in series-parallel configuration, thereby creating a stationary magnetic rotor field.

The system of the preceding paragraph can optionally include, additionally and/or alternatively, any one or more of the following features, configurations and/or additional components:

A further embodiment of the foregoing system, wherein the rotor further includes phase shifting elements for each of the second and third rotor phase excitation windings. When the switches are in the grid-power switch configuration, the phase shifting elements for each of the second and third rotor phase excitation windings are electrically connected in series with each of the second and third rotor phase excitation windings, respectively.

A further embodiment of any of the foregoing systems, wherein the phase shifting elements for each of the second and third rotor phase excitation windings can be an inductor and a capacitor, respectively.

A further embodiment of any of the foregoing systems, wherein the value of inductance and capacitance of the inductor and capacitor can be selected so as to shift the phases of electrical currents conducted by the second and third rotor phase excitation windings by plus and minus sixty degrees, respectively.

A further embodiment of any of the foregoing systems, wherein the series-parallel configuration of the rotor phase excitation windings can include a series connection of first rotor phase excitation windings and parallel-connected second and third rotor phase excitation windings.

A further embodiment of any of the foregoing systems, wherein when the switches are in a grid-power switch configuration, phase shifting elements can shift the phase of the excitation power applied to each of the second and third rotor phase excitation windings.

A further embodiment of any of the foregoing systems, wherein when the switches are in a grid-power switch configuration, phase shifting elements can shift the phase of the excitation power applied to each of the second and third rotor phase excitation windings.

A further embodiment of any of the foregoing systems, wherein the stator phase windings can include three grid-connection nodes and three power-output nodes that provide connections to each of the three wye-configured or delta-configured stator phase windings at different peripheral locations of the stator winding.

A further embodiment of any of the foregoing systems can further include a bidirectional energy storage unit and a polyphase rectifier conductively coupled to the three power-output nodes, the polyphase rectifier providing DC power to an energy storage unit.

A further embodiment of any of the foregoing systems can further include a DC chopper and bidirectional current regulator interposed between the polyphase rectifier and the energy storage unit.

A further embodiment of any of the foregoing systems can further include a DC-AC inverter and a DC-DC boost converter interposed between the energy storage unit and the DC-AC inverter.

A further embodiment of any of the foregoing systems, wherein the transfer from a power-generation switch configuration to grid-power switch configurations occurs within a single frequency of an AC power cycle.

A further embodiment of any of the foregoing systems, wherein the transfer from a grid-power switch configurations to power-generation switch configuration can occurs within a single frequency of an AC power cycle.

A further embodiment of any of the foregoing systems, wherein the stator further includes charging windings and boost windings. The charging windings include first, second, and third charging phase windings wye-configured for three-phase operation. Each of the first, second, and third charging phase windings have a plurality of series-connected inductive coils. The pluralities of series-connected inductive coils of the first, second, and third charging windings distributed about the stator, thereby developing a charging voltage. The boost windings that include first, second, and third boost phase windings wye-configured or delta-configured for three-phase operation. Each of the first, second, and third boost phase windings have a plurality of series-connected inductive coils. The pluralities of series-connected inductive coils of the first, second, and third boost windings peripherally distributed about the stator in a boost arrangement. The boost arrangement is configured so as to provide additional inductance and induced voltage to be used by an external power conditioning apparatus.

Some embodiments relate to a method for operating a synchronous electric generator in multiple modes. The method includes operation in two modes: a grid-power mode and a power-generation mode. In the grid-power mode, the method includes: i) applying three-phase AC grid power to three wye-configured stator phase windings at first, second, and third grid-connection nodes; ii) applying a first phase of the three-phase AC grid power across first and second excitation nodes of a rotor as an excitation power; iii) wye-configuring three rotor phase excitation windings in response to applying the first phase of the three-phase AC grid power across the first and second excitation nodes, the wye-configured rotor phase excitation windings having first, second, and third power-connection nodes; iv) phase shifting, by a first phase angle, the excitation power applied to the first excitation node; v) conductively coupling the excitation signal phase shifted by the first phase angle to the first power-connection node; vi) phase shifting, by a first phase angle, the excitation signal applied to the first excitation node; vii) conductively coupling the excitation power phase shifted by the second phase angle to the second power-connection node; and viii) conductively coupling the excitation power applied to the first excitation node to the third power-connection node of the wye-configured rotor phase excitation windings. In a power-generation mode, the method includes: i) applying DC power across first and second excitation nodes of a rotor for purposes of field excitation; ii) straight-configuring three rotor phase excitation windings in response to applying the DC power across the first and second excitation nodes, the straight-configured rotor phase excitation windings having first and second power-connection nodes; iii) conductively coupling the excitation power applied to the first excitation node to the first power-connection node; iv) conductively coupling the excitation power applied to the second excitation node to the second power-connection node; and v) rotating the straight-configured rotor within polyphase-configured stator phase windings, thereby generating electrical power at first, second, and third power-output nodes.

The method of the preceding paragraph can optionally include, additionally and/or alternatively, any one or more of the following features, configurations and/or additional components:

A further embodiment of the foregoing method can further include detecting, by an excitation detector, whether the excitation power is a DC excitation power or an AC excitation power.

A further embodiment of any of the foregoing methods can further include: selecting grid-power mode in response to detecting an AC excitation power; and selecting power-generation mode in response to detecting a DC excitation power.

A further embodiment of any of the foregoing methods can further include outputting, at first second, and third power-output nodes of the wye-configured or delta-configured stator phase windings, three-phase AC power.

A further embodiment of any of the foregoing methods can further include boosting the three-phase AC power output by providing autotransformer voltage gain by locating the grid-connection nodes at internal nodes of the wye-configured or delta-configured stator phase windings and locating the power-output nodes at ends of the wye-configured or delta-configured stator phase windings.

A further embodiment of any of the foregoing methods can further include: converting the three-phase AC power output to rectified DC power; and DC-DC boosting the rectified DC power using winding leakage inductance of boost windings of the stator.

A further embodiment of any of the foregoing methods can further include conditioning power using inductance of the boost windings.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the invention.

The invention claimed is:

1. A system for multi-mode synchronous electrical power generation, the system comprising:
   a stator including:
     main stator windings that have first, second, and third stator phase windings wye-configured for three-phase operation, each of the first, second, and third stator phase windings having a plurality of series-connected inductive coils, the pluralities of series-connected inductive coils of the first, second, and third stator windings distributed about the stator in a stator arrangement; and
   a rotor that is rotatable within the stator, the rotor including:
     a slip ring(s) via which an excitation power is applied to the rotor;
     a rotor configuration engine having:
       an excitation detector that detects whether the excitation power applied to the rotor is a DC excitation power or an AC excitation power;
       a configuration switch(es); and
       a configuration controller that sets the configuration switch(es) to a power-generation switch configuration in response to the excitation detector detecting a DC excitation power, and sets the configuration switch(es) to a grid-power switch configuration in response to the excitation detector detecting an AC excitation power; and
     rotor windings that include first, second, and third rotor phase excitation windings, each having a plurality of series-connected inductive coils distributed about the rotor in a fashion that corresponds to the stator arrangement, wherein when the switches are in the grid-power switch configuration, the first, second, and third rotor phase excitation windings are wye-configured to create a revolving magnetic field, and when the switches are in the power-generation switch configuration, the first second and third rotor phase excitation windings are in series-parallel configuration, thereby creating a stationary magnetic rotor field.

2. The system of claim 1, wherein the rotor further comprises:
   phase shifting elements for each of the second and third rotor phase excitation windings, wherein when the switches are in the grid-power switch configuration, the phase shifting elements for each of the second and third rotor phase excitation windings are electrically connected in series with each of the second and third rotor phase excitation windings, respectively.

3. The system of claim 2, wherein the phase shifting elements for each of the second and third rotor phase excitation windings are an inductor and a capacitor, respectively.

4. The system of claim 3, wherein the value of inductance and capacitance of the inductor and capacitor is selected so as to shift the phases of electrical currents conducted by the second and third rotor phase excitation windings by plus and minus sixty degrees, respectively.

5. The system of claim 1, wherein the series-parallel configuration of the rotor phase excitation windings comprises:
   a series connection of first rotor phase excitation windings and parallel-connected second and third rotor phase excitation windings.

6. The system of claim 1, wherein the stator phase windings include three grid-connection nodes and three power-output nodes that provide connections to each of the three wye-configured stator phase windings at different peripheral locations of the stator winding.

7. The system of claim 6, further comprising:
   a bidirectional energy storage unit; and
   a polyphase rectifier conductively coupled to the three power-output nodes, the polyphase rectifier providing DC power to an energy storage unit.

8. The system of claim 7, further comprising:
   a DC chopper and bidirectional current regulator interposed between the polyphase rectifier and the energy storage unit.

9. The system of claim 8, further comprising:
   a DC-AC inverter; and
   a DC-DC boost converter interposed between the energy storage unit and the DC-AC inverter.

10. The system of claim 9, wherein the transfer from the power-generation switch configuration to the grid-power switch configuration occurs within a single period of an AC power cycle without loss of output power.

11. The system of claim 9, wherein the transfer from the grid-power switch configuration to the power-generation switch configuration occurs within a single period of an AC power cycle without loss of output power.

12. The system of claim 1, wherein the stator further comprises:
   charging windings that include first, second, and third charging phase windings wye-configured for three-phase operation, each of the first, second, and third charging phase windings having a plurality of series-connected inductive coils, the pluralities of series-connected inductive coils of the first, second, and third charging windings distributed about the stator, thereby developing a charging voltage; and
   boost windings that include first, second, and third boost phase windings wye-configured for three-phase operation, each of the first, second, and third boost phase windings having a plurality of series-connected inductive coils, the pluralities of series-connected inductive coils of the first, second, and third boost windings peripherally distributed about the stator in a boost arrangement,
   wherein the boost arrangement is configured so as to provide additional inductance and induced voltage to be used by an external power conditioning apparatus.

13. A method for operating a synchronous electric generator in multiple modes, the method including:
   in a grid-power mode:
     applying three-phase AC grid power to three wye-configured stator phase windings at first, second, and third grid-connection nodes;
     applying a first phase of the three-phase AC grid power across first and second excitation nodes of a rotor as an excitation power;
     wye-configuring three rotor phase excitation windings in response to applying the first phase of the three-phase AC grid power across the first and second excitation nodes, the wye-configured rotor phase excitation windings having first, second, and third power-connection nodes;

phase shifting, by a first phase angle, the excitation power applied to the first excitation node;

conductively coupling the excitation signal phase shifted by the first phase angle to the first power-connection node;

phase shifting, by a first phase angle, the excitation signal applied to the first excitation node;

conductively coupling the excitation power phase shifted by the second phase angle to the second power-connection node; and conductively coupling the excitation power applied to the first excitation node to the third power-connection node of the wye-configured rotor phase excitation windings; and in a power-generation mode:

applying DC power across first and second excitation nodes of a rotor for purposes of field excitation;

straight-configuring three rotor phase excitation windings in response to applying the DC power across the first and second excitation nodes, the straight-configured rotor phase excitation windings having first and second power-connection nodes;

conductively coupling the excitation power applied to the first excitation node to the first power-connection node;

conductively coupling the excitation power applied to the second excitation node to the second power-connection node; and rotating the straight-configured rotor within wye-configured stator phase windings, thereby generating electrical power at first, second, and third power-output nodes.

14. The method of claim 13, further comprising:
detecting, by an excitation detector, whether the excitation power is a DC excitation power or an AC excitation power.

15. The method of claim 14, further comprising:
selecting grid-power mode in response to detecting an AC excitation power; and
selecting power-generation mode in response to detecting a DC excitation power.

16. The method of claim 13, further comprising:
outputting, at first second, and third power-output nodes of the wye-configured stator phase windings, three-phase AC power.

17. The method of claim 16, further comprising:
boosting the three-phase AC power output by providing autotransformer voltage gain by locating the grid-connection nodes at internal nodes of the wye-configured stator phase windings and locating the power-output nodes at ends of the wye-configured stator phase windings.

18. The method of claim 17, further comprising:
converting the three-phase AC power output to rectified DC power; and
DC-DC boosting the rectified DC power using winding leakage inductance of boost windings of the stator.

19. A multi-mode synchronous electrical generator comprising:
a prime mover configured to rotate a drive shaft;
a rotor coupled to the drive shaft;
a polyphase stator circumscribing the rotor and including:
main stator windings that include first, second, and third stator phase windings wye-configured for three-phase operation, each of the first, second, and third stator phase windings having a plurality of series-connected inductive coils, the pluralities of series-connected inductive coils of the first, second, and third stator windings distributed about the stator in a circumferential layout;
a plurality of slip rings and current collection brushes for facilitating conduction of an electrical excitation power to the rotor regardless of whether the rotor is rotating or not rotating; and
a configurable rotor winding coupled to the rotor, the configurable rotor winding including:
first, second, and third rotor phase windings that generate magnetic fields in response to conducting electrical current therethrough,
wherein first, second, and third rotor phase windings are configurable either in a power-generation mode or in a grid-power mode, when configured in the grid-power mode, first, second, and third phase windings are wye-configured with phase shifting elements for receiving a single-phase AC excitation power, thereby creating a revolving magnetic field when configured in the grid-power mode, first and second phase windings are parallel-configured in series with third phase windings generating a plurality of DC magnetic poles in a stationary magnetic field;
first and second phase-shifting elements coupled to the first and second phase windings; and
first and second switching elements that enable or disable phase-shifting, by first and second phase-shifting elements, electrical current conducted by first and second phase windings, respectively.

20. The multi-mode synchronous electrical generator of claim 19, wherein the stator winding is a delta connected polyphase winding with internal tap points to facilitate an auto-transformer connection.

* * * * *